United States Patent
Sanchez et al.

[11] Patent Number: 5,872,648
[45] Date of Patent: Feb. 16, 1999

[54] ON-AXIS SPATIAL LIGHT MODULATORS AND METHODS OF USE

[75] Inventors: Julian David Sanchez, Lowell; Drew A. Pommet, North Billerica; Michael A. Fiddy; Carl W. Lawton, both of Chelmsford, all of Mass.

[73] Assignee: University of Massachusetts, Boston, Mass.

[21] Appl. No.: 869,438

[22] Filed: Jun. 4, 1997

[51] Int. Cl.[6] .............................. G02B 26/00; G02B 27/46
[52] U.S. Cl. ......................... 359/290; 359/559; 359/561; 356/347
[58] Field of Search ..................................... 359/290, 298, 359/301, 558, 559, 561; 356/347, 349

[56] References Cited

U.S. PATENT DOCUMENTS

| | | | |
|---|---|---|---|
| 5,132,811 | 7/1992 | Iwaki et al. | 359/561 |
| 5,309,523 | 5/1994 | Iwaki et al. | 359/561 |
| 5,479,257 | 12/1995 | Hashimoto | 356/347 |
| 5,581,383 | 12/1996 | Reichel et al. | 359/561 |
| 5,600,485 | 2/1997 | Iwaki et al. | 359/561 |
| 5,606,457 | 2/1997 | Chiu et al. | 359/561 |

OTHER PUBLICATIONS

Joseph et al., "Optical Fourier Processing Using Photoinduced Dichroism in a Bacteriorhodopsin Film", *Optics Letters*, 21:1499–1501 (Sep. 15, 1996).

Birge, "Nature of the primary photochemical events in rhodospin and bacteriorhodospin", *Biochimica et Biophysica Acta*, 1016:293–327 (1990).

Birge, "Protein–Based Computers", *Scientific American*, 90–95 (Mar. 1995).

Burykin et al., "Photoinduced Anisotropy in Bio–Chrom Films", *Optics Communications*, 54:68–70 (May 1985).

Imam et al., "Photoanisotropic incoherent–to–coherent converter using a bacteriorhodospin thin film", *Optics Letters*, 20:225–277 (Jan. 15, 1995).

Zeisel et al., "Spectral Relationship of Light–Induced Refractive Index and Absorption Changes in Bacteriorhodospin Films Containing Wildtype $BR_{wt}$ and the Varient $BR_{D96N}$", *J. Phys. Chem.*, 96:7788–7792 (1992).

"Broadband Metal–Dielecric Hybrid Cube Beamsplitters", http://www.newport.com/optics/section5/Broad.html, (Jun. 2, 1997).

*Primary Examiner*—Loha Ben
*Attorney, Agent, or Firm*—Fish & Richardson P.C.

[57] ABSTRACT

New on-axis, optically addressable spatial light modulators (SLMs) and methods of use are described. The new SLMs include a film of a photochromic material and a non-polarizing beam splitter arranged such that read and write beams counterpropagate with one another, and the read beam is separated from the path of the write beam after being transmitted through the photochromic material film without losing any polarization information encoded on the read beam. The new SLMs are advantageously implemented in incoherent-to-coherent optical converters and all-optical joint transform correlators.

29 Claims, 3 Drawing Sheets

ON-AXIS SPATIAL LIGHT MODULATORS AND METHODS OF USE

BACKGROUND OF THE INVENTION

This invention relates to on-axis spatial light modulators (SLMs) and optical processing, and combinations of SLMs to form all-optical correlators.

Optical correlators are dedicated optical computers capable of determining the degree of similarity between two or more images. Optical correlators can be used in, for example, fingerprint identification, machine vision, image processing, and on-line product evaluation in a manufacturing process. Optical correlators are attractive because of their ability to parallel process information at the speed of light.

Practical optical correlators require the capability for both dynamic input and dynamic filtering. To perform these tasks, spatial light modulators (SLMs), which are programmable masks, are used to imprint two-dimensional information (i.e., an image) onto a coherent optical wavefront. SLMs are typically electronically addressable devices, e.g., liquid crystal displays, which pose a variety of input/output bottlenecks, performance limitations, and packaging problems.

Optically addressable SLMs (OASLMs) typically offer higher resolution and can handle higher information transfer rates by taking advantage of the inherent parallelism found with optics. OASLMs have been limited by the available materials for their manufacture.

One class of materials for use in OASLMs is photochromic materials. These materials are capable of changing color upon exposure to radiant energy such as light. One such material is rhodopsin, or "visual purple," a photosensitive, red protein pigment in the retinal rods of marine fishes and most higher vertebrates, e.g., octopus, mollusks, and man. A protein related both in structure and function to rhodopsin is the halobacterial retinal-containing protein, bacteriorhodopsin (bR), which is a light-absorbing protein synthesized by the bacteria *Halobacterium halobium*. The chromophore is a retinal moiety linked via a protonated Schiff base near the middle of helix G to lysine-216.

In its natural state the bR molecules perform the biological function in the halobacterial cell of converting light into an electrochemical ion gradient across the membrane, i.e., it pumps cytoplasmic protons across the membrane to the outside of the cell, to synthesize ATP from inorganic phosphate and ADP. When irradiated, individual bR molecules undergo light-induced structural changes that result in large changes in optical properties as the molecule passes through different states in a so-called "photocycle."

In the initial B state of bR, also called the "light adapted" state, the retinal chromophore is in an all-trans molecular configuration. The B state has an absorption maximum at 570 nm, with a broad absorption band of +/−100 nm, that allows bR to be excited by means of light in the red, yellow, or green portions of the optical spectrum. Once a photon is absorbed, the retinal chromophore undergoes configurational and conformational changes, the first of which is in a sub-picosecond time frame. The chromophore subsequently goes through a series of short-lived intermediates to the so-called M state, which has an absorption maximum at 410 nm wavelength.

The M state can revert to the initial B state via thermal relaxation processes or by photochemical processes upon excitation with blue light (410+/−50 nm). The thermal relaxation of the chromophore from the M state is initiated by the reprotonation of the aspartic acid in position 96 (Asp-96 residue). The retinal molecule is then able to isomerize once again and relax to the all-trans B state. The lifetime of the M state depends on the kinetics of the reprotonation process, and can be altered by different means such as controlling the extent of drying, controlling pH, changing the temperature, and by modifying the molecular structure by genetic mutation. For example, Chen et al., *Appl. Opt.*, 30:5188 (1991) describes high pH bR films in which the M state lifetime is increased from milliseconds to tens of seconds. The time required to switch between the M and B states via a photochemical process is much faster than the states' lifetime, and is typically on the order of microseconds. Because of the short lifetimes of the other intermediate states, the bR photocycle can be approximated by a two-state model that includes only the B and M states.

Of the rhodopsins, bR is the most chemically and environmentally robust (it can be stored for years without degrading) and, unlike many biological materials, bR is not adversely affected by environmental perturbations such as heat, light, and humidity. In fact, bR is stable at temperatures of up to about 140° C., is stable with respect to photodegradation, and can be exposed to light for long periods of time without sacrificing optical performance. For example, no noticeable change is observed after a bR film is switched between the B and M states more than a million times with a quartz lamp with appropriate color filters.

In addition to its stability, bR has many desirable optical properties. Bacteriorhodopsin has a high optical absorption cross-section for both B and M states and attains optical saturation at moderate intensities (e.g., 100 mW/$cm_2$). Bacteriorhodopsin additionally has a fast switching time, and can switch between M and B states in a matter of microseconds. Due to its optical properties, bR has been proposed as a material with applications in photonics technology, e.g., in information processing (Chen et al., *Applied Optics*, 30:5188, 1991; Korchemskaya et al., *Sov. Journal of Quantum Electronics*, 17:450, 1987), and in computer memories (Birge et al., *Scientific American*, p. 90, March, 1995).

The use of bR in optical image processing is based on the fact that bR's absorption of light triggers a photochemical cycle in the bR molecule. In its initial state, the bR film is isotropic with a random but rigid orientation of bR molecules. Illumination of a bR film at a wavelength of about 570 nm (B to M state transition) reduces the absorption coefficient of the film at that wavelength, and bleaches these molecules. Upon illumination of the film with a linearly polarized light (a so-called "actinic beam"), the film shows anisotropic properties of photoinduced dichroism and photoinduced birefringence (Burykin et al., *Opt. Commun.*, 54:68, 1985). The magnitude and sign of the induced anisotropy are dependent on the actinic light intensity and wavelength. Since the actinic beam is linearly polarized and the bR molecules in the film are randomly oriented but rigidly maintained, only those bR molecules that have their transition dipole moments oriented for absorption in or near the electric field direction of the light are bleached. Turning off the actinic beam returns the film to its initial isotropic state with a relaxation time equal to the lifetime of the intermediate M state.

One practical concern when using OASLMs is the subsequent separation of the addressing beam or "write beam" from the coherent optical wavefront or "read beam," on which the image information is imparted. To address this concern, in many cases, only one of the read and write beams are oriented "on-axis," i.e., normal to the SLM, hence the read and write beams are spatially separated from one another subsequent to the SLM, even though they spatially overlap in the plane of the SLM. In other cases, where both of the read and write beams are oriented on-axis and are collinear with one another, a filter is used to block the wavelengths of the write beam and transmit the wavelengths of the read beam. For example, see, Imam et al., *Opt. Lett.*, 20:225 (1995). In these cases, therefore, the wavelengths of the write beam must be different than the wavelengths of the read beam.

SUMMARY OF THE INVENTION

The invention is based on the realization that a non-polarizing beamsplitter can be combined with a film of a photochromic material to produce an optically addressable SLM, in which the read and write beams counterpropagate with one another, and the read beam is separated from the path of the write beam after being transmitted through the photochromic material without losing any polarization information that is encoded on the read beam. The new SLMs are advantageously implemented in incoherent-to-coherent optical converters and all-optical joint transform correlators.

In general, in one aspect, the invention features a spatial light modulator (SLM) including (1) a film of a photochromic material, the film being arranged to receive a polarized write beam that is substantially normal to a front face of the film and a polarized read beam that is substantially normal to a back face of the film, wherein at least one of the polarization, intensity, and optical phase of a spatial component of the read beam that overlaps on the film with a spatial component of the write beam is modified by the response of the photochromic material to the spatial component of the write beam; and (2) a non-polarizing beamsplitter positioned in the path of the write beam prior to the film for redirecting a portion of the read beam transmitted through the film along a path non-collinear with the path of the write beam, thereby forming an output beam.

The polarization of the spatial component of the read beam that overlaps on the film with the spatial component of the write beam can be modified by the response of the photochromic material to the spatial component of the write beam.

The SLM can further include a polarizer positioned to receive the output beam. For example, the polarizer can be oriented orthogonal to the polarization of the read beam prior to the film. The SLM can further include a lens for imaging the write beam onto the film. For example, the lens can be positioned between the beamsplitter and the film. In addition, the SLM can further include a polarizer for polarizing the read beam positioned in the path of the read beam prior to the film. Further, the SLM can include a polarizer for polarizing the write beam positioned in the path of the write beam prior to the beamsplitter.

The photochromic material used in the film can be an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog of any of the materials.

In another aspect, the invention features an optical processing system including the new SLM, and a first light source, e.g., a Helium Neon (HeNe) laser or a diode laser generating wavelengths in the range of 630+/-15 nm, for generating a read beam, e.g., a coherent read beam. The first light source of the optical processing system can generate the write beam. Alternatively, the optical processing system can further include a second light source for generating the write beam, wherein the write beam carries image information. For example, the second light source can be incoherent and be directed towards an object to generate the image information and produce the write beam. The write beam can have wavelength components in common with wavelength components of the read beam.

In another embodiment, the new SLM can further include a first polarizer for polarizing the read beam and being positioned in the path of the read beam prior to the film; a second polarizer positioned to receive the output beam and being oriented at about 90 degrees relative to the first polarizer; and a third polarizer for polarizing the write beam and being positioned in the path of the write beam prior to the beamsplitter and oriented at about +/-45 degrees relative to the first polarizer.

The new SLM can further include a lens positioned between the beamsplitter and the film for imaging the write beam at an input plane prior to the beamsplitter onto the film and for imaging the read beam immediately after the film onto a output plane in the path of the output beam after the second polarizer.

In other embodiments, the new SLM can further include a lens positioned between the beamsplitter and the film for imaging the Fourier transform of the write beam at an input plane prior to the beamsplitter onto the film and imaging the Fourier transform of the read beam immediately after the film onto a correlation plane in the path of the output beam after the second polarizer. Alternatively, the new SLM can further include a polarizer positioned to receive the output beam; and a lens positioned between the beamsplitter and the film for imaging the Fourier transform of the write beam at an input plane prior to the beamsplitter onto the film and for imaging the Fourier transform of the read beam immediately after the film onto a correlation plane in the path of the output beam after the polarizer.

The optical processing system can include the new SLM; a half-wave plate positioned in the output plane of the SLM oriented to rotate the linear polarization of the output beam by +/-45 degrees to form a second write beam; a second film including a photochromic material, the second film being arranged to receive the second write beam substantially normal to a front face of the second film and a polarized second read beam that is substantially normal to a back face of the second film; a second non-polarizing beamsplitter positioned between the half-wave plate and the second film for redirecting a portion of the second read beam transmitted through the second film, thereby forming a second output beam; a fourth polarizer for receiving the second output beam; and a second lens positioned between the second beamsplitter and the second film for imaging the Fourier transform of the second write beam at the first mentioned output plane onto the second film and imaging the Fourier transform of the read beam immediately after the second film onto a correlation plane in the path of the output beam after the fourth polarizer.

This optical processing system can further include a coherent first light source for generating the first mentioned read beam and the second read beam. The first light source can also generate the first mentioned write beam. The optical processing system can further include a second light source for generating the first mentioned write beam.

In another aspect the invention features a method of separating a read beam from a write beam incident on a transmissive film by illuminating the film with a polarized write beam that is substantially normal to a front face of the film; illuminating the film with a polarized read beam that is substantially normal to a back face of the film; and separating the read beam transmitted through the film from the path of the write beam using a non-polarizing beamsplitter. In this method, the read beam and the write beam can have common wavelengths, and the transmitted read beam can have a spatially-varying polarization that carries information imparted on the film by the write beam.

A "photochromic material" is any optically sensitive material that exhibits a photoinduced anisotropy that depends on the intensity of polarized optical radiation illuminating the material.

An "analog" of a photochromic material is a variant of a naturally occurring photochromic material, but maintains the property of intensity-dependent, photoinduced anisotropy. Thus, a "bacteriorhodopsin analog" is any form of bR that is different from the naturally occurring, wild-type form, but that still exhibits the property of intensity-dependent, photoinduced anisotropy. The bR or bR analog can be contained in a variety of matrix environments. Examples of bR analogs include mutant forms in which one or more amino acids are altered or exchanged, e.g., by genetic engineering techniques, and chemically altered forms, in which the bR chromophore retinal is replaced with an altered or different chromophore, e.g., an azulene derivative of retinal.

A "spatial component" of a beam is a portion of the transverse spatial extent of the beam.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention features numerous advantages including the following. The SLM can operate when both the read beam and the write beam are oriented "on-axis," i.e., normal to the surface of the photochromic film. On-axis operation optimizes the spatial resolution of the SLM and reduces noise. On-axis operation can occur even if the read and write wavelengths are the same, and/or without losing any information that is encoded in the polarization of the modulated read beam. Using the same wavelength for the read and write beams allows the SLMs to be cascaded in arbitrary optical processing systems, such as an all-optical joint transform correlator (JTC).

All-optical correlators can process information at the speed of light and have applications in, for example, fingerprint identification, machine vision, image processing, and on-line product evaluation in manufacturing. Furthermore, the invention features operation of the SLMs with read and write wavelengths around 630 nm, where there are a variety of relatively inexpensive and compact light sources, such as HeNe and diode lasers.

More importantly, the SLMs enable all-optical processing systems that capture images under ambient light conditions, convert the image into a coherent wavefront, and thereafter carry out processing, such as correlation.

Other features and advantages of the invention will be apparent from the following detailed description, and from the claims.

DETAILED DESCRIPTION

The invention features optically addressable SLMs (OASLMS) including both a non-polarizing beamsplitter and a photochromic material film, in which the read and write beams counterpropagate with one another, and in which the read beam is separated from the path of the write beam after transmission through the photochromic material film. The new OASLMs are advantageously implemented in an incoherent-to-coherent optical converter and an all-optical joint transform correlator.

Spatial Light Modulators

Figure 1:
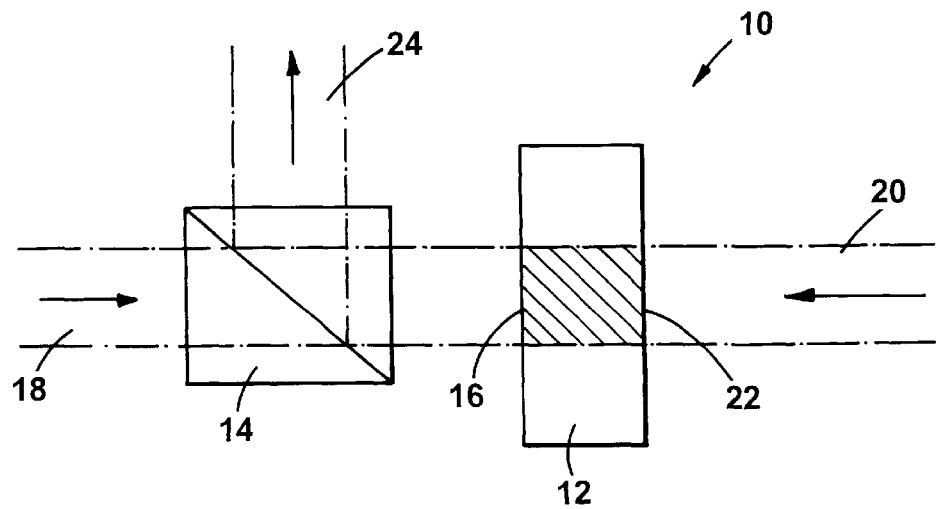
FIG. 1 is a schematic diagram of an optically addressable SLM.

As shown in FIG. 1, the new spatial light modulator (SLM) 10 includes a film 12 of photochromic material, such as bacteriorhodopsin (bR), and a non-polarizing beamsplitter 14 (commercially available, e.g., from Newport Corp., Irvine, Calif.) adjacent to the film 12. This combination allows read and write beams to be oriented on-axis, thereby optimizing the spatial resolution and diffraction efficiency of the SLM, and also allows the path of the read beam to be separated from the path of the write beam, even if the read and write beams have common wavelengths and/or arbitrary linear polarizations.

During use, a linearly-polarized write beam 18, which carries image information, is transmitted through non-polarizing beamsplitter 14, and is thereafter normally incident on the front face 16 of film 12. Since beamsplitter 14 is non-polarizing, the polarization of write beam 18 is unaffected by its transmission through the beamsplitter. Write beam 18 overlaps on film 12 with a linearly-polarized read beam 20, which is normally incident on the back face 22 of film 12. As will be described below, the photochromic material alters the polarization of components of read beam 20 in response to write beam 18, thereby imparting the image information onto read beam 20.

Typically, the linear polarizations of the read and write beams differ by about +/−45 degrees. After propagating through film 12, a portion of read beam 20 is redirected by beamsplitter 14 to form an output beam 24. Because beamsplitter 14 is non-polarizing, it does not affect the polarization information present in output beam 24 encoded by film 12. In this way, the output beam contains the image information and is separated from the path of the write beam.

The SLM can operate over any range of read and write wavelengths as long as the photochromic film exhibits a photoinduced anisotropy at these wavelengths. In particular, the wavelengths of the write beam must overlap with the absorption band of the photochromic transition, and the wavelengths of the read beam must overlap with wavelengths for which there is a change in the transmission properties of the photochromic material corresponding to the transition induced by the write beam. For example, in bR, the write beam wavelengths can be in the range of about 570 nm +/−100 nm, and the read beam wavelengths can be in the range of about 400 nm to 800 nm, more preferably at about 630 nm +/−40 nm and about 470 nm +/−40 nm.

In what follows, photochromic materials suitable for the SLM, and the mechanism for altering polarization will be described. Thereafter, an all-optical incoherent-to-coherent converter and an all-optical joint-correlator that advantageously implement the SLM will be described.

Photochromic Materials

Photochromic materials that can be used in the film of the SLM include organic photochromic fulgides, cytochrome C, azo dyes such as naphthol red and yellow, carbazole compounds with a conjugated side chain and/or electron withdrawing groups, phycobiliproteins such as phycocyanins and phycoerythrins, fluorescent dyes such as erythrosin and fluorescein, the rhodopsins, bacteriorhodopsin, and their respective analogs.

Fulgides, as described in Kirkby et al., "Optical Nonlinearity and Resonant Bistability in Organic Photochromic Thin Films," p. 165 in *Optical Bistability III*, Gibbs et al. (eds.), Proceedings (Tucson, Ariz., Dec. 2–4, 1985, Springer, New York, 1985), include E-a-2,5-dimethyl-3-furyl ethylidene (isopropylidene) succinic anhydride, which has been shown to have a bleached state under UV (300–375 nm) illumination, and a colored state under green light (514+/−50 nm) illumination.

Phycobiliproteins are deeply colored, highly fluorescent photoreceptor pigments found in blue-green, red, and cryptomonad algae. These pigments are classified according to their absorption maxima, with phycocyanins having an absorption maximum in the blue wavelengths, phycoerythrins having an absorption maximum in the red wavelengths, and allophycocyanins which have an absorption maximum in the pale blue wavelengths. Phytochrome is a similar biliprotein found in plants, and exists in two forms that are interconverted upon alternate exposure to red and far-red light.

Rhodopsins, as found in most vertebrates, can be used in the optical processing systems, but are generally not preferred because they are difficult to stabilize for long periods of time. For example, human, octopus, mollusk, and insect rhodopsin, and analogs thereof, should be useful in the present invention.

On the other hand, a related molecule, bacteriorhodopsin (bR), is a preferred photochromic material for use in the optical processing systems, because of its high stability. Different forms, or analogs, of bR can be used in the processing systems to achieve different results. Bacteriorhodopsin can be modified to tailor its optical properties, e.g., absorption bands and kinetic properties, for specific applications. These properties can be adjusted in a controlled manner, meaning that analogs of bR can be tailored to operate in combination with a wide range of light sources, such as lasers, e.g., diode or HeNe lasers, or white light sources.

For example, the lifetime of the M state can be increased to lower the saturation intensity level of a particular bR-containing material at 410+/−50 nm. This, in turn, can significantly lower the power requirements of devices manufactured using this material. For example, the M state lifetime can be increased by adjusting the pH to about 8 to 10 during manufacture of a thin polymer film containing bR. When the pH is increased in this manner, the saturation intensity level of the M state decreases.

The lifetime also can be altered by adding chemicals such as polyvalent metal ions, guanidine hydrochloride, diaminopropane, or ethylene diamine, to a polymer matrix including bR, or by creating mutant forms of the bR protein through genetic engineering. For example, the aspartic acid residue at position 96 in the bR protein can be replaced by an asparagine residue to increase the M state lifetime from 10 to 750 milliseconds. See, e.g., Birge, *Computer*, 56–67 (November 1992).

Further, the absorption bands for both the B and M states can be changed to enable the use of different wavelength input and modulation fields as described herein. For example, substituting an azulene derivative of retinal for the naturally-occurring retinal chromophore results in a bR molecule that has an absorption band shifted into the infrared portion of the optical spectrum. See, e.g., Asato et al., *J. Am. Chem. Soc.*, 112:7390–7399 (1990). A 13-trifluoromethyl-retinal derivative brings the modified bR into the range of diode laser wavelengths. See, e.g., Gaertner et al., *J. Am. Chem. Soc.*, 103:7642–7643 (1981). Using other retinal analogs, bR's absorption bands can be shifted to nearly any portion of the near-infrared/visible/near-ultraviolet spectrum. See, e.g., Oesterhelt et al., *Quarterly Rev. Biophysics*, 24:425–478 (1991).

For use in an SLM, bR is preferably dispersed into a polymer matrix and cast into a thin film that can be inserted into the device. Such a thin film can be prepared from the purple membrane of Halobacterium halobium, e.g., as follows. The isolated membranes are first washed with deionized water and then passed through a 5 μm pore size filter to remove particulate matter. A stock solution of 40% (w/w) acrylamide can be made with an acrylamide to N,N'-methylene-bis-acrylamide ratio of 20:1. A concentrated bR solution (3.5 ml) is then mixed with the acrylamide stock solution (0.5 ml). Two glass plates separated by three, 3 mm thick spacers are used to form a rectangular gel cassette. A gel solution is prepared by mixing a polymerization catalyst, ammonium persulfate (0.03% w/w), and an initiator, N,N,N',N'-tetramethylethylenediamine (1 μl/ml), with the bR/acrylamide solution. The gel solution is poured into the cassette immediately after preparation.

After polymerization, the cast gel can be removed from the cassette and rinsed with deionized water. The gel is then soaked in a sodium borate buffer (pH 10, 10 mM) for 24 hours. The buffer-equilibrated gel is then covered with two gel-drying cellulose films and held firmly in a drying cell. The film can be dried at room temperature for about 24 hours. The dried bR-polymer film can then be held between two glass plates to prevent deformation.

The final film had an optical density of 0.45 absorbance units at 458 nm, 2 absorbance units at 568 nm, and 0.14 absorbance units at 633 nm. The final film preferably has an optical density of about between 2 and 5 absorbance units at 570 nm. The preferred thickness of the film is between about one hundred microns and one micron. The main advantage of preparing the film using this method is that the M state lifetime can be varied by changing the pH of the soaking buffer solution.

Alternatively, commercial bR films are available from, e.g., Bend Research (Bend, Oreg.) and Wacker Chemical (Norwalk, Conn.).

Mechanism for Altering Polarization

Typically, the bR molecules in a bR film are randomly oriented. When a linearly-polarized write beam having wavelengths within the broad absorption band of the B-state (570 nm+/−100 nm) is incident on a bR film, bR molecules that are oriented such that their dipole moments are parallel to the polarization of the write beam are selectively excited and driven into the M-state, thereby creating a photoinduced anisotropy in the film. This anisotropy will exhibit dichroism, i.e., polarization-dependent absorption, and birefringence, i.e., a polarization-dependent refractive index.

The maximum dichroism occurs at about 570 nm. In contrast, the birefringence is minimized at this wavelength, as is expected from the Kramers-Kronig relationship. The maximum absolute birefringence occurs, with opposite signs, at about 470 nm and 630 nm, respectively. See, e.g., Zeisel and Hampp, *J. Phys. Chem.*, 96:7788–7792 (1992). The birefringence and/or dichroism can be used to alter the intensity, optical phase, and/or polarization of a linearly-polarized read beam.

Preferably, the read beam is chosen at a wavelength where the photoinduced birefringence is largest and the optical density of the film is minimized, i.e., about 470 nm or about 630 nm. Most preferably, a coherent read beam having a wavelength of about 630 nm (e.g., in the range of 600 nm to 670 nm) is used, because relatively inexpensive and compact optical sources, such as HeNe and diode lasers, operate at these wavelengths. The source for the coherent read beam can also be used to generate the write beam, since wavelengths at about 630 nm are still within the absorption band of the B to M transition.

In one configuration, the linear polarization of the write beam is preferably at about 45 degrees to the linear polarization of the read beam. The write beam photoinduces a birefringence in the bR film that is sampled by the read beam. As a result, those components of the read beam that overlap on the film with components of the write beam will have their linear polarization transformed into an elliptical polarization upon passing through the film. When the partially elliptically-polarized read beam is sent through a polarizer that is crossed to the original polarization of the read beam, the transmitted beam is linearly polarized and carries the image information of the write beam. For modest film thicknesses and write beam intensities, the spatial intensity profile of the write beam (i.e., the image information) is linearly mapped onto the amplitude of the read beam transmitted through the polarizer.

In other configurations, the elliptically-polarized read beam is sent through a polarizer that is parallel to the original polarization of the read beam. As with the crossed polarizers, the transmission of the elliptically-polarized read beam through the polarizer will be related to the photoinduced birefringence in the film. The transmission of light through anisotropic materials and a general description of light polarization is described in, for example, M. Born and E. Wolf, *Principles of Optics* (Pergamon Press, London, 1959).

Incoherent-to-Coherent Image Converter and Fourier Transform Computer

Figure 2:
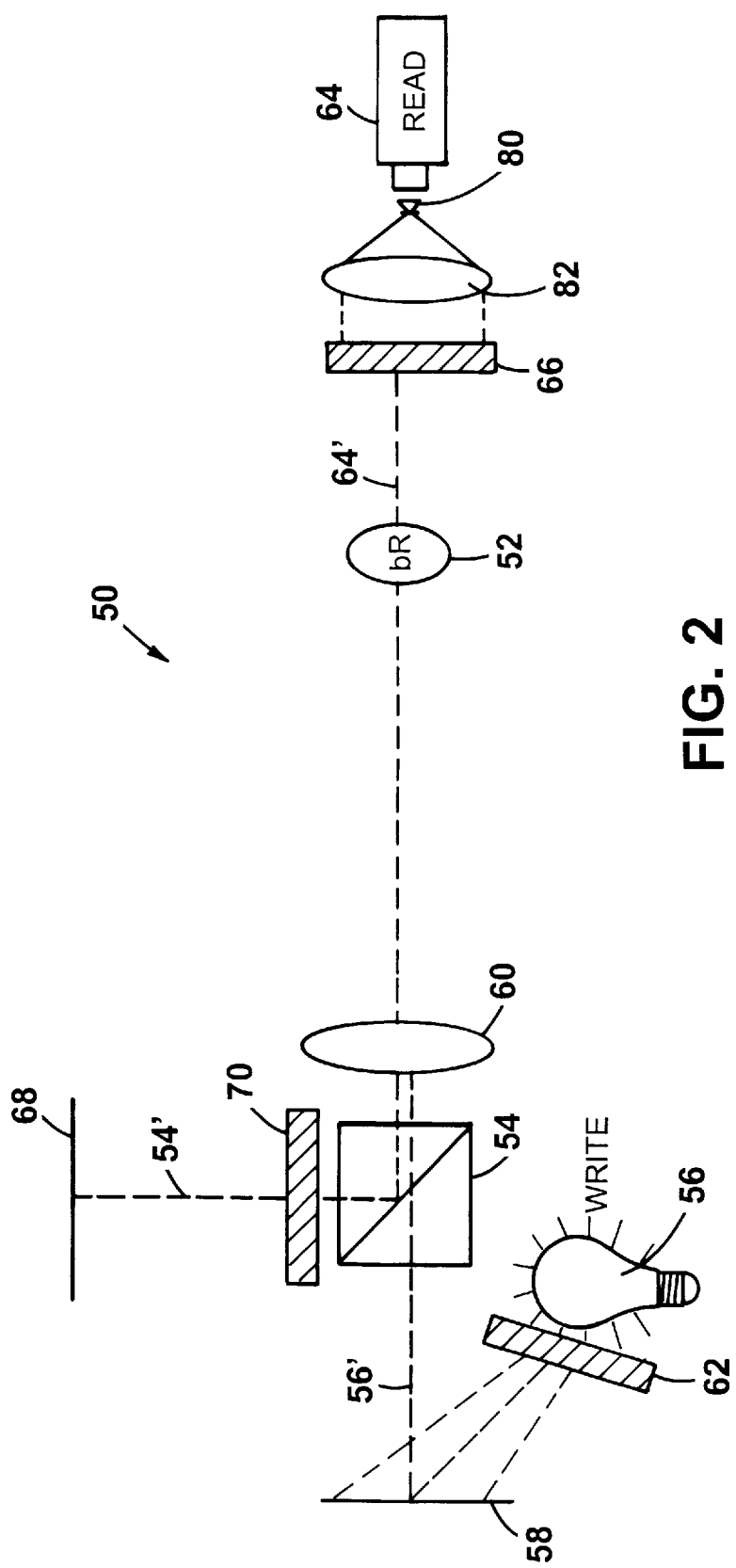
FIG. 2 is a schematic diagram of an incoherent-to-coherent image converter implementing the SLM of FIG. 1.

As shown in FIG. 2, module 50 demonstrates how an SLM including a bR film 52 and a 50 percent-reflecting:50 percent-transmitting, non-polarizing beamsplitter 54 can be used in an incoherent-to-coherent image converter. An incoherent source 56 is used to illuminate an object in an input plane 58 to generate an incoherent write beam 56' carrying information, i.e., an image. The profile of the write beam 56' in the input plane 58 is imaged onto the bR film at normal incidence with a lens 60. A polarizer 62 is used to linearly polarize the write beam 56' at about 45 degrees. Beamsplitter 54 is positioned after polarizer 62 and input plane 58 but before bR film 52, so that a portion (i.e., about 50 percent) of the write beam 56' is transmitted to the film. On the opposite side of film 52, a coherent source 64, e.g., a HeNe or diode laser, is used in conjunction with a spatial filter 80 and a lens 82 to generate a collimated read beam 64', which is linearly polarized at about 0 degrees by polarizer 66, and is thereafter normally incident on bR film 52.

After passing through bR film 52, a portion (i.e, about 50%) of the read beam 64' is redirected towards an output plane 68 by beamsplitter 54, thereby producing an output beam 54'. Lens 60, which is positioned between beamsplitter 54 and bR film 52, images the wavefront of the read beam immediately after the bR film onto output plane 68. A linear polarizer 70 is positioned between beamsplitter 54 and output plane 68 and oriented at about 90 degrees. A CCD camera (not shown) can be used to record the image in output plane 68.

With no write beam illumination, the read beam 64' is completely extinguished at the output plane by polarizer 70, and no output beam 54' is produced. When the write beam 56' illuminates regions of the bR film 52, bR molecules in those areas are driven into the M-state. Since the write beam is polarized, and the bR molecules are rod-like, a preferential B to M state change is induced along the polarization axis. This is the basic mechanism for the photoinduced anisotropy described above. At a read wavelength of 633 nm, which is the wavelength of a HeNe laser, the anisotropic absorption (dichroism) is minimized, while the anisotropic refractive index change (birefringence) is significant. This results in a polarization state change for the read beam 64'. Where the read and write beam overlap in the bR film, the read beam will undergo a polarization change from linear to elliptical, and will be transmitted through polarizer 70. Where there is no write information, the polarization of the read beam will remain linear and will be blocked by polarizer 70.

It is important to note that the polarization is not rotated, but merely gains a phase-leading orthogonal component (elliptical). The degree of ellipticity is primarily dependent on the write intensity and the write wavelength(s), but is independent of coherence. The fact that the dichroism is minimized is independent of the intensity and the wavelength used to write, but is keenly dependent on the read wavelength. In this way, an image imparted on an incoherent write beam can be converted into an image on a coherent output beam.

Module 50 shown in FIG. 2 can also be used as a Fourier transform optical computer. In this case, source 56 generates a coherent beam, and lens 60 is positioned to Fourier transform the write beam 56' profile in the input plane onto the bR film 52 and Fourier transform the profile of the read beam 64' immediately after the bR film onto output plane 68. In particular, lens 60 is positioned such that the distances between input plane 58 and lens 60, lens 60 and bR film 52, and lens 60 and output plane 68 are each one focal length (f) of the lens. Since the bR film is affected by the intensity of the light falling on it, the square modulus of the Fourier transform photoinduces the birefringence. The counter-propagating read beam is again Fourier transformed and analyzed. The image in the output plane is the Fourier transform of the power spectrum of the input image, or the autocorrelation of the input image. This will be discussed in greater detail in the next section.

In this Fourier transform embodiment, it is possible that both the read beam and the write beam are generated from the same coherent source, even though this implies that they have common wavelengths. As discussed above, one of the advantages of the new SLM design is that the read and write beams can have the same wavelength even in the on-axis arrangement shown in FIG. 2.

In other embodiments, lens 60 can be replaced by two other lenses. A first lens positioned between incoherent source 56 and beamsplitter 54 for imaging/Fourier transforming the write beam 56' onto the bR film 52, and a second lens positioned between beamsplitter 54 and output plane 68 for imaging/Fourier transforming the read beam 64' onto the output plane.

Fourier Processing and Joint Transform Correlators

Optical Fourier processing is a powerful tool in optical computing and processing systems. In almost all cases, a coherent source is used. Typically, optical Fourier processing ("spatial filtering") systems include a series of lenses that process an optical input by relative masking or matching of the Fourier domain frequencies at the common Fourier plane of the lenses. Nonlinear optical materials have been used to implement Fourier transform operations, such as edge enhancement, band pass filtering, noise removal, and pattern recognition, of optical inputs. See for example, Oesterhelt et al., *Quarterly Rev. Biophysics*, 24:425–478 (1991). The parallel processing nature of optics and the real-time characteristics of many nonlinear optical materials contribute to the importance of optical Fourier processing using nonlinear materials.

In the present invention, the bR film in the SLM is used as a square law device because the photoinduced birefringence is proportional to the intensity of the write beam and maps onto the coherent wavefront (i.e., the amplitude) of the read beam. This property can be exploited, for example, in a joint transform correlator (JTC).

Figure 3:
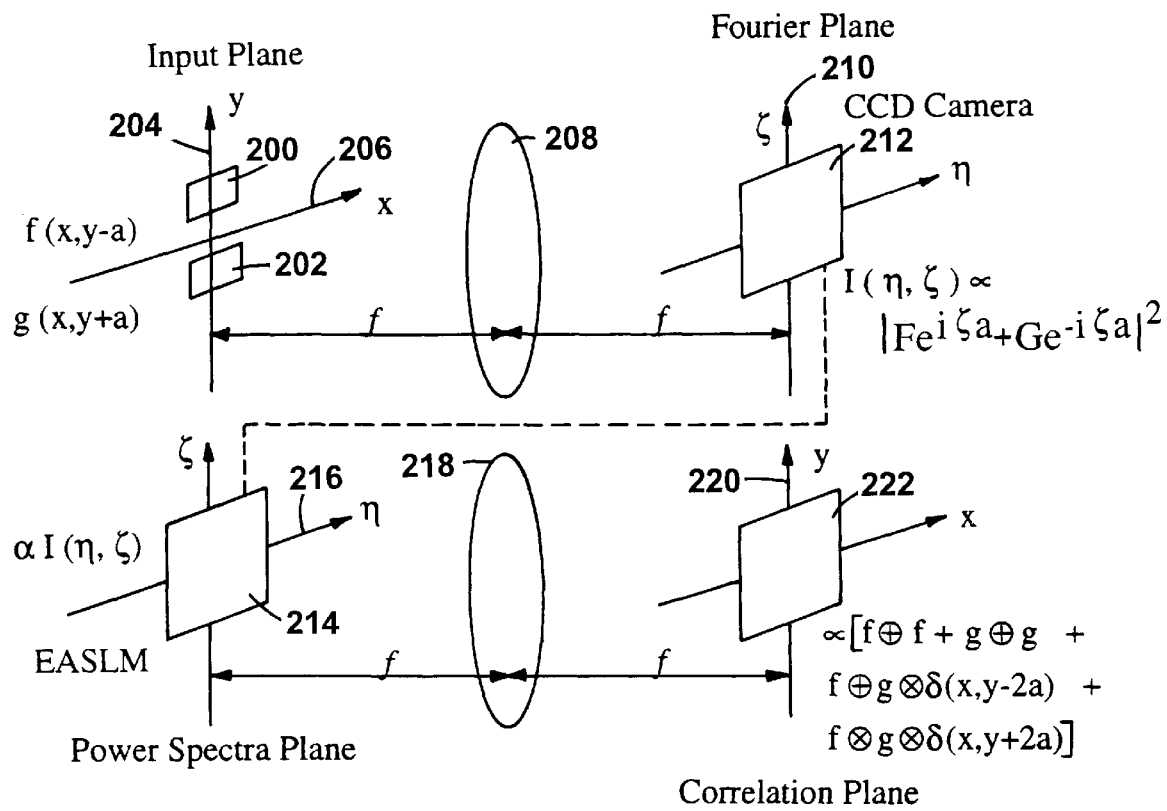
FIG. 3 is a schematic diagram of the non-linear processing involved in a joint transform correlator (JTC).

A standard JTC architecture is shown schematically in FIG. 3. An input scene f(x,y) 200, and a reference scene g(x,y) 202 are positioned in an input plane 204. A coherent wavefront 206 carrying this information is Fourier transformed by a lens 208. At the Fourier plane 210, a square law device 212 records the joint power spectrum of the input and reference scene. Typically, this device is a CCD camera, which electronically addresses an SLM 214 with the joint power spectrum recorded by the CCD camera. This joint power spectrum displayed on the SLM is read by a coherent wave 216, and a Fourier transform operation is performed again by a second lens 218. At the output plane (correlation plane) 220, information regarding the degree of similarity between the two images is obtained and recorded by a detector 222, typically another CCD camera. Intense peaks will indicate a strong similarity, and their location will indicate the location of the reference features relative to the input scene, as denoted by the cross-correlation terms in FIG. 3. Note that in FIG. 3, ⊕ denotes the correlation operation, and denotes the convolution operation.

The CCD and the electronically addressable SLM indicated schematically FIG. 3 can advantageously be replaced with the optically addressable SLM based on bR to produce an all-optical JTC. This profoundly improves the performance (by removing electronic bottlenecks) and compactness of the JTC. However, even in this case, the JTC requires that the image carrying input beam be coherent.

Since the wavelengths used to write to and read from the on-axis bR SLMs can be the same, the incoherent-to-coherent image converter described herein can be cascaded with the all-optical JTC. The resulting all-optical system captures images using ambient incoherent light, converts these images into a coherent wavefront, and thereafter performs optical processing such as correlation. Such a system is described below.

All-Optical Processing System

Figure 4:
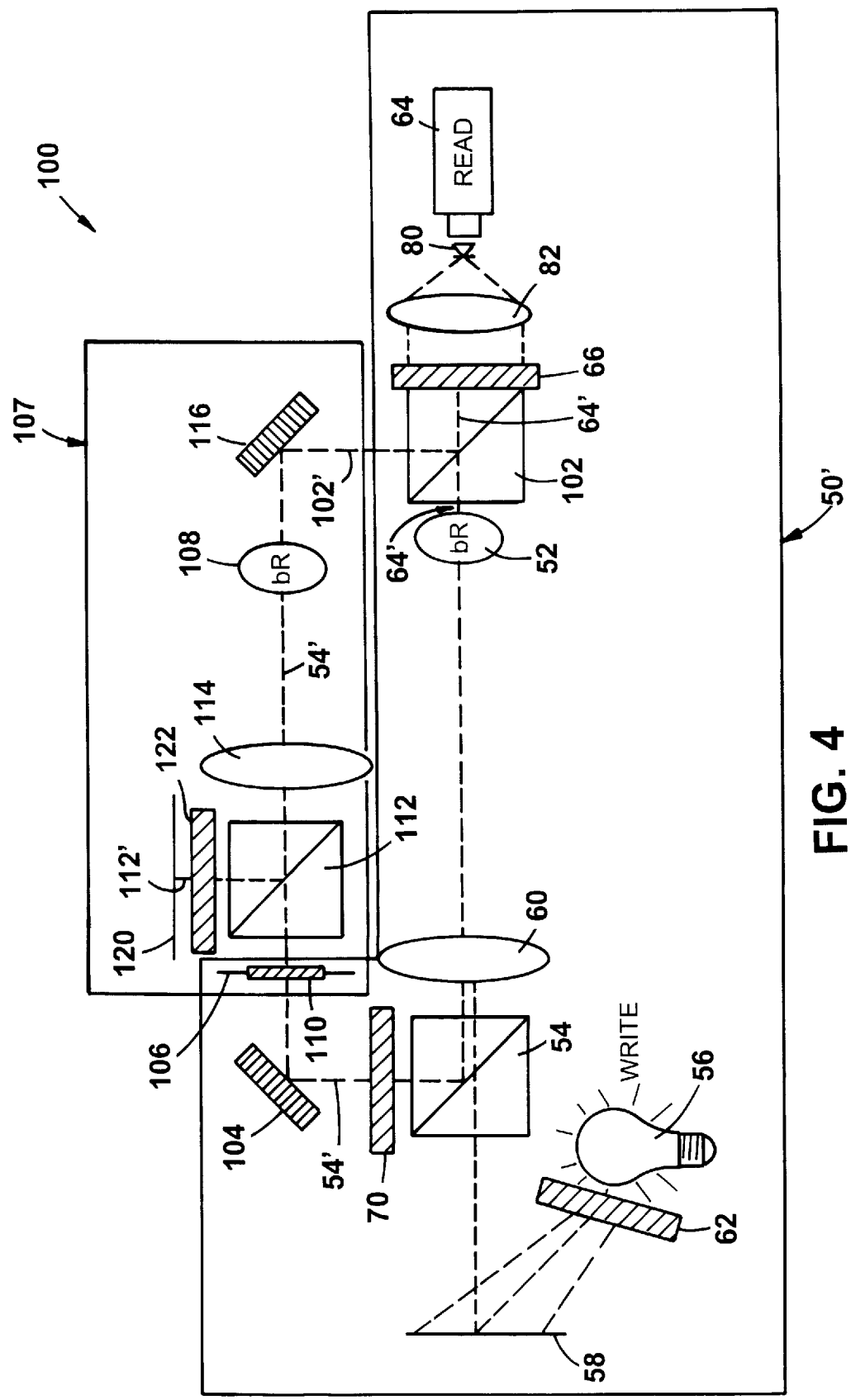
FIG. 4 is a schematic diagram of an all-optical JTC implemented as a pair of cascaded SLMS, wherein the SLMs are of the type shown in FIG. 1.

The incoherent-to-coherent image converter and the all-optical JTC described above are cascaded with one another to form an all-optical processing system for performing joint-transform correlation 100 from an incoherent image, as shown in FIG. 4. Module 50' for the incoherent-to-coherent image converter is identical to module 50 described in FIG. 2, with the following exceptions. A 50 percent-transmitting/50 percent-reflecting beamsplitter 102 is positioned between polarizer 66 and bR film 52 to split off a portion (i.e., about 50 percent) of the read beam 64' for use as a second read beam 102' in the Fourier transform optical computer 107. Also, a mirror 104 is used to redirect the output beam 54' from the incoherent-to-coherent image converter 50 onto a different output plane 106.

The coherent output beam 54' at output plane 106 is used as the write beam for a second bR film 108 in the Fourier transform optical computer 107. A half-wave plate 110 is positioned in output plane 106 and oriented to rotate the linear polarization of the output beam 54' to 45 degrees. Positioned between half-wave plate 110 and bR film 108 is a 50 percent-reflecting/50 percent-transmitting non-polarizing beamsplitter 112 followed by a lens 114. A portion (i.e., about 50%) of the output beam is transmitted through beamsplitter 112 and directed at normal incidence toward bR film 108. Lens 114 is positioned to take the Fourier transform of the profile of the output beam 54' in output plane 106 and image it onto bR film 108. The spatial profile of the birefringence induced in bR film 106 will be proportional to the intensity profile of the Fourier transform profile (i.e., the modulus squared of the Fourier transform of the image in output plane 106).

The spatially-varying birefringence induced in bR film 108 will be imparted onto the second read beam 102', which is directed normally onto the opposite side of bR film 108 by a mirror 116. As described herein, portions of the second read beam 102' that overlap with the birefringence induced in bR film 108 will become elliptically polarized. The profile of the second read beam 102' immediately after bR film 106 is Fourier transformed by lens 114 onto a correlation plane 120 in conjunction with beamsplitter 112, which redirects a portion (i.e., about 50 percent) of the second read beam towards correlation plane 120. A polarizer 122 is positioned between beamsplitter 112 and correlation plane 120, and is oriented at 90 degrees, so that only those components of the second read beam incident on the induced birefringence in bR film 108 will be transmitted through polarizer 122 as beam 112'.

A CCD camera can be positioned in the correlation plane to record the image produced by the all optical joint transform correlator.

Other Embodiments

It is to be understood that while the invention has been described in conjunction with the detailed description thereof, that the foregoing description is intended to illustrate and not limit the scope of the invention, which is defined by the scope of the appended claims. For example, though a joint-correlator is demonstrated by cascading the SLMs, the SLMs can be cascaded in any optical processing architecture, such as optical image preprocessing (i.e., edge enhancement, noise reductions, spatial filtering, etc.), digital multiplication by analog convolution (DMAC) processing, and neural network processing based on correlator-like architectures. Also, though modulation of a read beam based on photoinduced birefringence has been described, photoinduced dichroism in the SLMs can also be used to modulate the read beam. Furthermore, the non-polarizing beamsplitters need not be limited to 50 percent-reflecting/50 percent-transmitting, but, in general, can take a wide range of values.

Other aspects, advantages, and modifications are within the scope of the following claims.

What is claimed is:

1. A spatial light modulator (SLM) comprising:
    a film comprising a photochromic material, said film being arranged to receive a polarized write beam that is substantially normal to a front face of the film and a polarized read beam that is substantially normal to a back face of the film, wherein at least one of the polarization, intensity, and optical phase of a spatial component of the read beam that overlaps on the film with a spatial component of the write beam is modified by the response of the photochromic material to the spatial component of the write beam; and
    a non-polarizing beamsplitter positioned in the path of the write beam prior to the film for redirecting a portion of the read beam transmitted through the film along a path non-colinear with the path of the write beam, thereby forming an output beam.

2. The SLM of claim 1, wherein the polarization of the spatial component of the read beam that overlaps on the film with the spatial component of the write beam is modified by the response of the photochromic material to the spatial component of the write beam.

3. The SLM of claim 1, further comprising a polarizer positioned to receive the output beam.

4. The SLM of claim 3, wherein the polarizer is oriented orthogonal to the polarization of the read beam prior to the film.

5. The SLM of claim 1, further comprising a lens for imaging the write beam onto the film.

6. The SLM of claim 5, wherein the lens is positioned between the beamsplitter and the film.

7. The SLM of claim 1, further comprising a polarizer for polarizing the read beam positioned in the path of the read beam prior to the film.

8. The SLM of claim 1, further comprising a polarizer for polarizing the write beam positioned in the path of the write beam prior to the beamsplitter.

9. The SLM of claim 1, wherein the photochromic material is an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog of any of said materials.

10. The SLM of claim 9, wherein the photochromic material is bacteriorhodopsin or a bacteriorhodopsin analog.

11. An optical processing system comprising:
    the SLM of claim 1; and
    a first light source for generating the read beam.

12. The optical processing system of claim 11, wherein the read beam is coherent.

13. The optical processing system of claim 11, wherein the first light source further generates the write beam.

14. The optical processing system of claim 11, further comprising a second light source for generating the write beam, wherein the write beam carries image information.

15. The optical processing system of claim 14, wherein the second light source is incoherent and is directed towards an object to generate the image information and produce the write beam.

16. The optical processing system of claim 15, wherein the write beam has wavelength components in common with wavelength components of the read beam.

17. The optical processing system of claim 11, wherein the first light source is a Helium Neon laser.

18. The optical processing system of claim 11, wherein the first light source is a diode laser generating wavelengths in the range of 630+/−15 nm.

19. The SLM of claim 1, further comprising
    a first polarizer for polarizing the read beam and being positioned in the path of the read beam prior to the film;
    a second polarizer positioned to receive the output beam and being oriented at about 90 degrees relative to the first polarizer; and
    a third polarizer for polarizing the write beam and being positioned in the path of the write beam prior to the beamsplitter and oriented at about +/−45 degrees relative to the first polarizer.

20. The SLM of claim 19, further comprising:
    a lens positioned between the beamsplitter and the film for imaging the write beam at an input plane prior to the beamsplitter onto the film and for imaging the read beam immediately after the film onto an output plane in the path of the output beam after the second polarizer.

21. An optical processing system comprising:
    the SLM of claim 20;
    a half-wave plate positioned in the output plane of the SLM oriented to rotate the linear polarization of the output beam by +/−45 degrees to form a second write beam;
    a second film comprising a photochromic material, the second film being arranged to receive the second write beam substantially normal to a front face of the second film and a polarized second read beam that is substantially normal to a back face of the second film;
    a second non-polarizing beamsplitter positioned between the half-wave plate and the second film for redirecting a portion of the second read beam transmitted through the second film, thereby forming a second output beam;
    a fourth polarizer for receiving the second output beam; and
    a second lens positioned between the second beamsplitter and the second film for imaging the Fourier transform of the second write beam at the first mentioned output plane onto the second film and imaging the Fourier transform of the read beam immediately after the second film onto a correlation plane in the path of the output beam after the fourth polarizer.

22. The optical processing system of claim 21, further comprising a coherent first light source for generating the first mentioned read beam and the second read beam.

23. The optical processing system of claim 22, wherein the first light source also generates the first mentioned write beam.

24. The optical processing system of claim 22, further comprising a second light source for generating the first mentioned write beam.

25. The SLM of claim 19, further comprising:
    a lens positioned between the beamsplitter and the film for imaging the Fourier transform of the write beam at an input plane prior to the beamsplitter onto the film and imaging the Fourier transform of the read beam immediately after the film onto a correlation plane in the path of the output beam after the second polarizer.

26. The SLM of claim 1, further comprising:
    a polarizer positioned to receive the output beam; and
    a lens positioned between the beamsplitter and the film for imaging the Fourier transform of the write beam at an input plane prior to the beamsplitter onto the film and for imaging the Fourier transform of the read beam immediately after the film onto a correlation plane in the path of the output beam after the polarizer.

27. A method of separating a read beam from a write beam incident on a transmissive film, the method comprising the steps of:

illuminating the film with a polarized write beam that is substantially normal to a front face of the film;

illuminating the film with a polarized read beam that is substantially normal to a back face of the film; and separating the read beam transmitted through the film from the path of the write beam using a non-polarizing beamsplitter.

28. The method of claim 27, wherein the read beam and the write beam have common wavelengths.

29. The method of claim 28, wherein the transmitted read beam has a spatially-varying polarization that carries information imparted on the film by the write beam.

* * * * *